(12) United States Patent
Enoki et al.

(10) Patent No.: US 6,513,488 B2
(45) Date of Patent: Feb. 4, 2003

(54) FUEL INJECTION CONTROL APPARATUS FOR DIRECT INJECTION TYPE INTERNAL COMBUSTION ENGINE

(75) Inventors: Keiichi Enoki, Tokyo (JP); Hirofumi Ohuchi, Tokyo (JP); Takahiko Ono, Kobe (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 158 days.

(21) Appl. No.: 09/793,399

(22) Filed: Feb. 27, 2001

(65) Prior Publication Data

US 2002/0033165 A1 Mar. 21, 2002

(30) Foreign Application Priority Data

Sep. 18, 2000 (JP) ..................... P2000-282087

(51) Int. Cl.$^7$ .................................. F02B 5/00
(52) U.S. Cl. ..................... 123/305; 123/501
(58) Field of Search .................. 123/501, 305, 123/463, 478

(56) References Cited

U.S. PATENT DOCUMENTS

| 4,480,620 | A |   | 11/1984 | Tange et al. ............ 123/478 |
| 5,191,867 | A | * | 3/1993  | Glassey ................. 123/446 |
| 5,479,910 | A | * | 1/1996  | Bauer et al. ........... 123/179.17 |
| 5,860,406 | A | * | 1/1999  | Schmidt et al. ............ 123/479 |
| 5,960,765 | A |   | 10/1999 | Iida et al. ................... 123/295 |
| 6,053,150 | A | * | 4/2000  | Takahashi et al. .......... 123/300 |
| 6,227,166 | B1 | * | 5/2001 | Mack ........................ 123/446 |
| 6,286,480 | B1 | * | 9/2001 | Chen et al. ................. 123/380 |
| 6,302,082 | B1 | * | 10/2001 | Nagatani et al. ............ 123/305 |
| 6,425,367 | B1 | * | 7/2002 | Hiraya et al. ............... 123/299 |

* cited by examiner

*Primary Examiner*—John Kwon
(74) *Attorney, Agent, or Firm*—Sughrue Mion, PLLC

(57) ABSTRACT

Fuel injection control apparatus for direct injection type internal combustion engine controls timing of end of fuel injection so as to be capable of controlling fuel injection volume precisely without raising fuel pressure. The apparatus comprises crank angle sensor 16 detecting rotational angle of internal combustion engine, fuel injection valve 4 directly injecting fuel to combustion chamber, fuel pump 19 supplying fuel to said fuel injection valve 4 whereby supply pressure of fuel is set equal to or less than the maximum cylinder pressure during motoring of internal combustion engine 1, and control means 22 for controlling open or close timing of said fuel injection valve 4 to control fuel injection amount and fuel injection duration and judging timing of closing of the intake valve 9 of inner combustion engine 1 from the rotational angle output of crank angle sensor 16 and controlling fuel injection timing to close fuel injection valve 4 not later than the closing of intake valve 9.

3 Claims, 4 Drawing Sheets

FUEL INJECTION CONTROL APPARATUS FOR DIRECT INJECTION TYPE INTERNAL COMBUSTION ENGINE

BACKGROUND OF THE INVENTION

1. Field of the Invention

The present invention relates to a fuel injection control apparatus for direct injection type internal combustion engine, especially direct injection and spark Ignition type gasoline engine, which directly injects relatively low pressure fuel in each combustion chamber of internal combustion engine equipped with a plurality of cylinders and capable of controlling fuel injection volume precisely.

2. Description of the Background Art

In order to reduce noxious gas component exhausted from internal combustion engine carried by a vehicle or to improve fuel consumption, fuel injection apparatus for direct injection that directly injects fuel in combustion chamber is utilized and various kinds of technology to control injection volume and fuel injection timing of the fuel injection apparatus have been suggested. For instance, technology disclosed by Japanese Patent Laid-Open No. 312396/1996 bulletin is one example and the technology disclosed by this bulletin includes two types of injection mode and a switching means to switch between these two injection modes which consists of late injection, discharging fuel into combustion chamber during compression stroke of internal combustion engine, and early injection, discharging fuel into combustion chamber during intake stroke of internal combustion engine. On switching the injection mode by switching means, the values of combustion parameter effecting combustion condition is set according to the mode to be activated and injection mode is switched smoothly through control of internal combustion engine which is based on said values of combustion parameters.

As shown in the above bulletin, timing of fuel injection is set so that injection occurs either in compression stroke or intake stroke but fuel injection in compression stroke is intended to form fuel-air mixture having nearly the theoretical ratio in local area nearby ignition plug in a stratified formation which is overall a lean mixture having air-fuel ratio of 30–50. Stratified charge combustion serves to reduce pumping loss or cooling loss when there is light load on internal combustion engine and to improve fuel consumption by means of lean mixture combustion. However, since injection volume increases when there is heavy load on internal combustion engine and air-fuel ratio nearby ignition plug has excessive local density to cause misfire, timing is switched so that fuel injection occurs during intake stroke of internal combustion engine under heavy load to form homogeneous mixture in combustion chamber to make uniform combustion, wherein intake air is cooled by carburetion of fuel injected in combustion chamber so that intake air amount increases and the timing of knocking point advances, resulting in horsepower improvement of internal combustion engine.

In addition, if timing is set so that fuel injection occurs in compression stroke of internal combustion engine, high fuel pressure is required resulting in fuel injection valve becoming oversized. A technique suggested to avoid these problems is the one disclosed by Japanese Patent Publication No. 51893/1989 bulletin. The technique disclosed by this bulletin sets injection pressure of fuel injection valve (fuel pressure) equal to or less than the maximum cylinder pressure of internal combustion engine during motoring and sets the time of the end of fuel injection to be before the time when fuel pressure has the same value with cylinder pressure of internal combustion engine during motoring. Accordingly, fuel injection under low pressure into combustion chamber in the amount required in accordance with the load of internal combustion engine is made possible and the size of fuel pump or fuel injection valve is miniaturized.

None of the conventional fuel injection control apparatus for direct injection type internal combustion engine as mentioned above has fuel adhesion to inlet port, in contrast with multi point injection (so-called MPI) type engine wherein fuel is directly injected in inlet port of internal combustion engine. This enhances the responsiveness of fuel injection control to achieve accurate control of air-fuel ratio. However, in the type of stratified charge combustion engine, since the pressure in combustion chamber is high and the interval from injection to ignition is short, it is required to raise pressure higher than 5 MPa so as to atomize fuel sufficiently. Therefore fuel pump for high pressure type is needed aside from the feed pump and the fuel pipe arrangement must bear high pressure resulting in that mechanical loss increases because of driving fuel pump under high pressure and the improvement of fuel consumption is limited.

In addition, pressure in combustion chamber varies as shown in FIG. 4. In other words, intake valve of internal combustion engine opens 5–10 degrees before intake air top dead center and since the surge tank provided in inlet passage and combustion chamber communicate with each other while intake valve is opened, the internal pressure of cylinder approximately equals to the pressure of surge tank and if intake valve closes at 50–60 degrees after bottom dead center, combustion chamber undergoes adiabatic compression and internal pressure of cylinder suddenly increases so that firing takes place 5–30 degrees before compression top dead center. In the technique disclosed by a Japanese Patent Publication No. 51893/1989 bulletin as a prior art mentioned above, since fuel pressure is set equal to or less than the maximum cylinder pressure of internal combustion engine during motoring and fuel injection ends before cylinder pressure reaches the fuel pressure, end time of injection is during compression stroke so that the pressure difference between internal pressure of cylinder and fuel pressure becomes small during the latter half of the fuel injection period, thereby decreasing the injection amount per unit time and consequently producing error in total injection volume.

Furthermore, as reduction of pressure differential between internal pressure of cylinder and fuel pressure makes injection speed of fuel injected by fuel injection valve slow down, fuel is not atomized sufficiently and combustion becomes worse. In addition, even if it is assumed that first half of a fuel injection period belongs to intake stroke of internal combustion engine, since pressure of the intake air passage fluctuates depending on the load on engine, pressure differential between fuel pressure and internal pressure of cylinder which has almost the same value as intake air passage varies to make a change in fuel injection amount. For example, pressure variation in surge tank due to change in condition of throttle valve of internal combustion engine from idle to full open reaches 0.7 MPa, that corresponds to 2.3% injection amount error wherein the lower the fuel pressure is, the greater the error becomes. Furthermore, when internal combustion engine has low temperature, combustion turns worse due to slow fuel carburetion or increase of injection amount, resulting in that noxious gas are generated or drivability is degraded.

SUMMARY OF THE INVENTION

The object of the present invention is to provide fuel injection control apparatus for direct injection type internal combustion engine which controls timing of end of fuel injection so as to be capable of controlling fuel injection volume precisely without raising fuel pressure.

Fuel injection control apparatus for direct injection type internal combustion engine according to the present invention comprises crank angle sensor detecting rotational angle of internal combustion engine, fuel injection valve directly injecting fuel to combustion chamber, fuel pump supplying fuel to said fuel injection valve with supply pressure of fuel being set equal to or less than the maximum cylinder pressure of internal combustion engine during motoring, and control means for controlling open or close timing of said fuel injection valve to control fuel injection volume and fuel injection duration and determining end time of the intake valve of inner combustion engine from the rotational angle of crank detected and output from sensor and controlling fuel injection timing to close fuel injection valve not later than the close timing of intake valve.

In addition, the apparatus comprises pressure regulator comparing pressure of intake air passage with that of fuel supplied by fuel pump and regulating fuel pressure to control pressure differential between the two to maintain a predetermined value.

Furthermore, the apparatus comprises temperature sensor detecting temperature of cooling water, whereby said control means advances timing of closing of fuel injection valve when said cooling water has low temperature.

DESCRIPTION OF THE PREFERRED EMBODIMENT

First Embodiment

Figure 1:
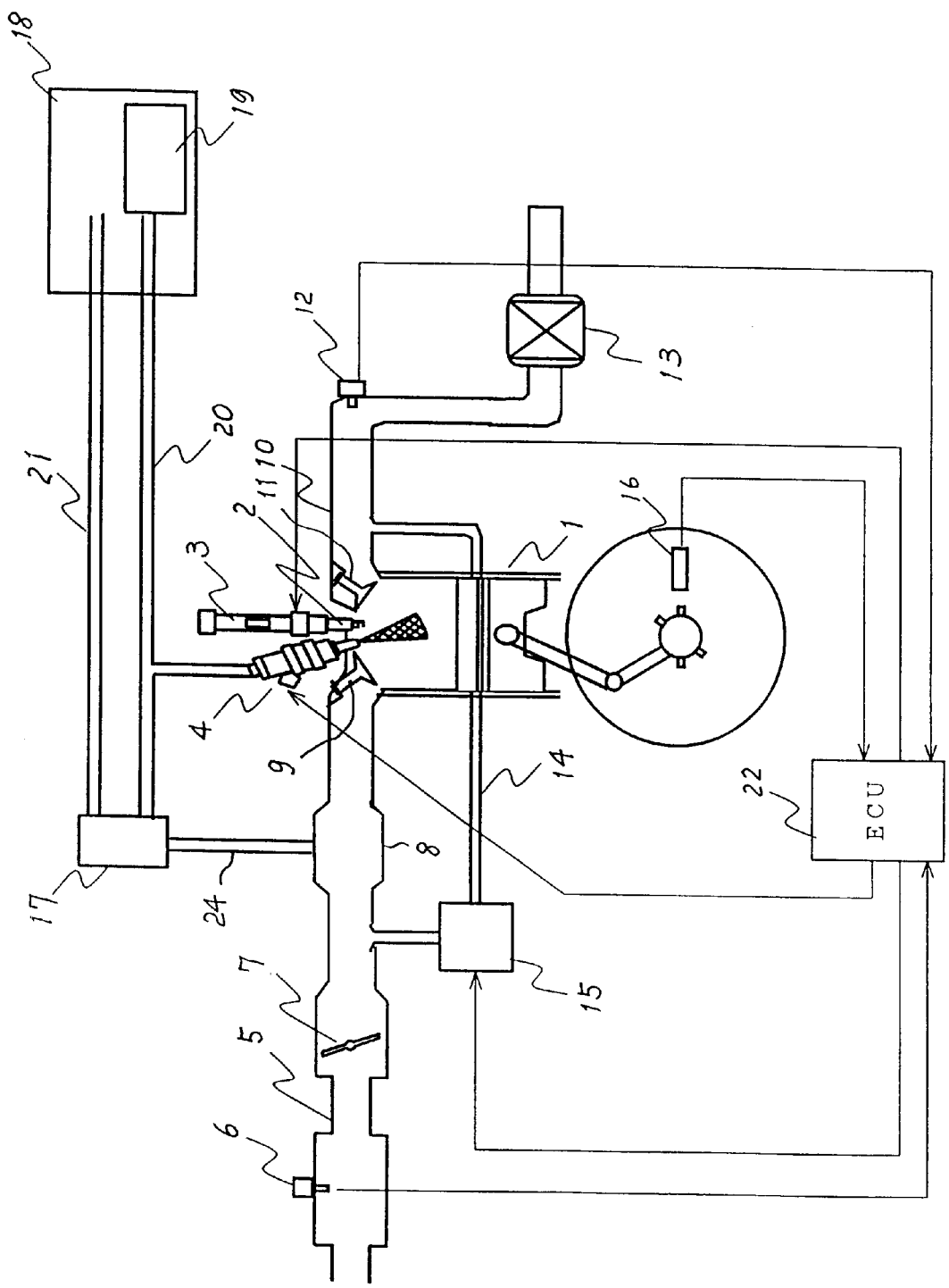
FIG. 1 shows a total block-diagram of fuel injection control apparatus for direct injection type internal combustion engine of the first embodiment according to the present invention.
Figure 2:
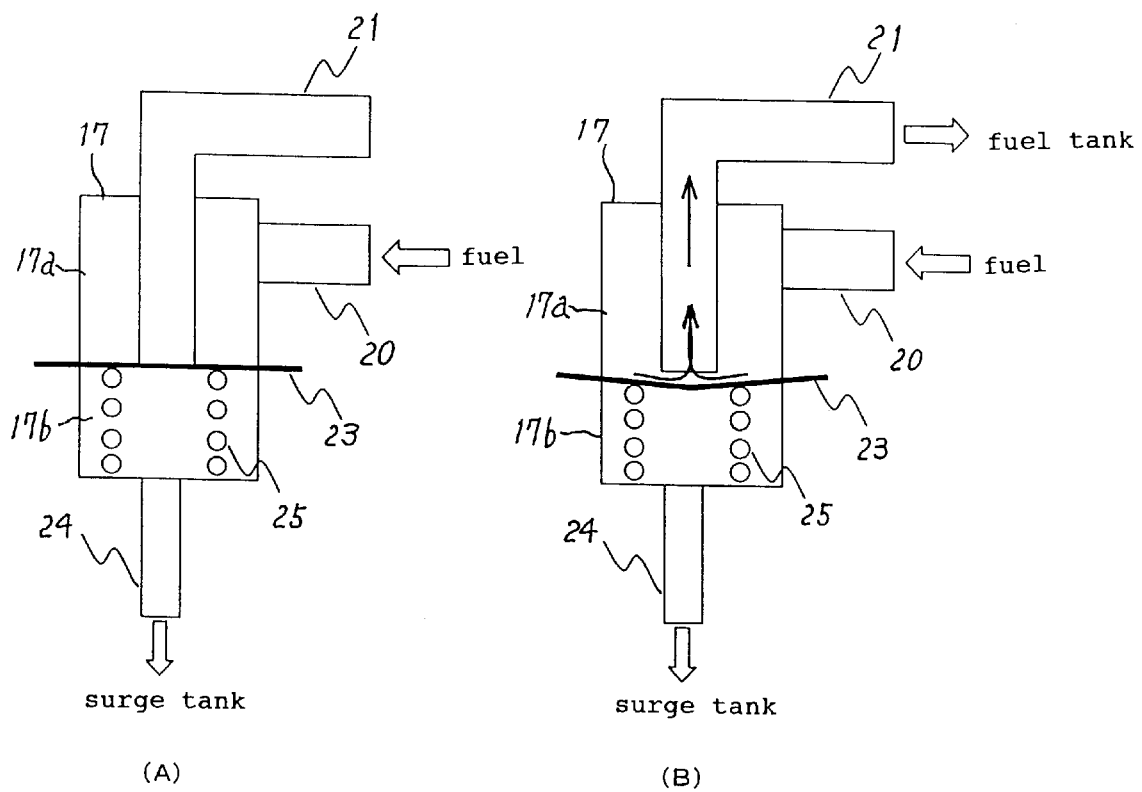
FIG. 2 shows a block-diagram of pressure regulator employed to fuel injection control apparatus direct injection type internal combustion engine of the first embodiment according to the present invention.
Figure 3:
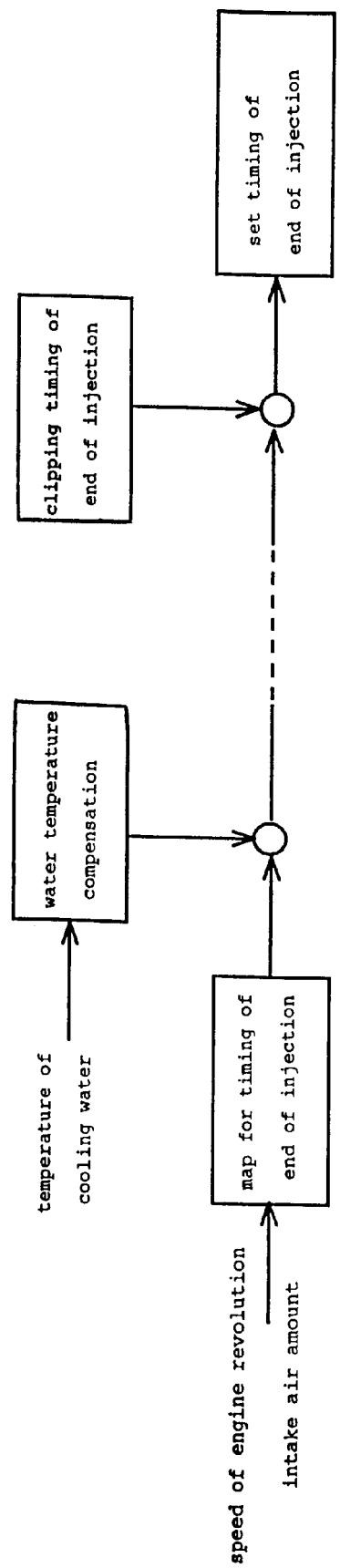
FIG. 3 shows a block-diagram explaining fuel injection control apparatus for direct injection type internal combustion engine of the first embodiment according to the present invention.
Figure 4:
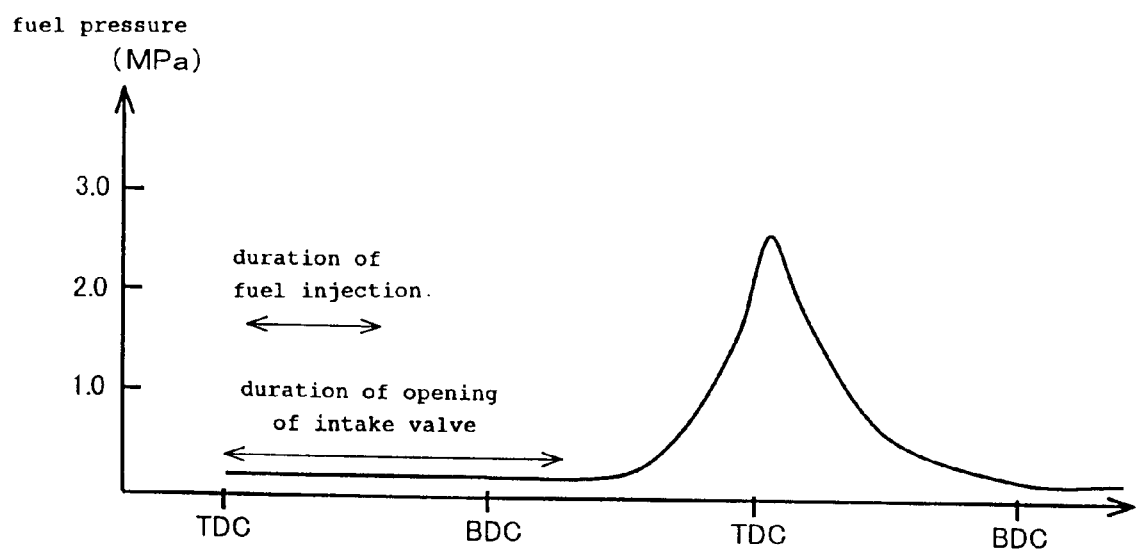
FIG. 4 is an explanatory drawing which shows cylinder internal pressure and fuel injection timing.

FIG. 1–FIG. 4 shows drawing explaining fuel injection control apparatus for direct injection type internal combustion engine of the first embodiment according to the present invention. FIG. 1 is a block-diagram which shows total structure. FIG. 2 is an explanatory drawing which shows structure of pressure regulator. FIG. 3 shows a motion interpretation block diagram explaining control action. FIG. 4 is a pressure diagram which shows chamber pressure of internal combustion engine. In FIG. 1, reference number 1 denotes internal combustion engine mounting fuel injection valve for direct injection, where only one cylinder is illustrated among plurality of cylinders. Reference number 2 denotes ignition plug implanted in cylinder head of internal combustion engine 1. Reference number 3 denotes ignition coil arranged at head portion of ignition plug 2. Reference number 4 denotes fuel injection valve assembled to cylinder head of internal combustion engine 1. Fuel injection valve 4 is constituted to inject fuel directly in combustion chamber of internal combustion engine 1.

Reference number 5 denotes intake pipe provided with air flow sensor 6 for measuring intake air volume of internal combustion engine 1 and throttle valve 7 for regulating intake air volume. Reference number 8 denotes surge tank formed between downstream of throttle valve 7 and intake valve 9 of internal combustion engine 1. Reference number 10 denotes exhaust manifold forming a passage of exhaust gas emitted from exhaust valve 11 of internal combustion engine 1. Reference number 12 denotes air-fuel ratio sensor attached to exhaust manifold 10 detecting air-fuel ratio from exhaust gas. Reference number 13 denotes three way catalyst provided in exhaust manifold 10. Reference number 14 denotes EGR passage provided between exhaust manifold 10 and surge tank 8 for refluxing part of exhaust gas to intake pipe 5. Reference number 15 denotes EGR control valve of stepper motor type provided on EGR passage 14 for adjusting reflux volume of exhaust gas. Reference number 16 denotes crank angle sensor provided on crankshaft etc. of internal combustion engine 1 for outputting crank angle signal and engine speed signal.

Reference number 17 denotes pressure regulator described below. Reference number 18 denotes fuel tank of a vehicle. Reference number 19 denotes fuel pump provided in fuel tank 18 for supplying pressurized fuel to fuel injection valve 4 and pressure regulator 17 through fuel pipe 20. Reference number 21 denotes return pipe refluxing fuel from pressure regulator 17 to fuel tank 18. Reference number 22 denotes control unit as a control means including microcomputer (as referred to ECU hereinafter). ECU 22 receives input information concerned with operating condition of internal combustion engine 1 such as intake air volume information from air flow sensor 6, air-fuel ratio information from air-fuel ratio sensor 12, crank angle signal from crank angle sensor 16 or temperature of cooling water and calculates parameters for controlling internal combustion engine 1 concerned with ignition timing control or fuel injection control and outputs driving signal needed for various actuators.

FIG. 2(A), (B) shows drawing to describe simplified structure and action of pressure regulator 17. Pressure regulator 17 is in general employed with MPI system but is not used in direct cylinder injection engine because of high fuel pressure. Interior of pressure regulator 17 is isolated by means of diaphragm 23 from fuel pressure room 17a and intake pressure room 17b. Fuel pipe 20 and return pipe 21 are connected to fuel pressure room 17a, and intake pressure pipe 24 communicating with surge tank 8 is connected to intake pressure room 17b, and diaphragm 23 shuts return pipe 21 by means of spring 25 having predetermined pressing force. As shown in FIG. 2(B), when differential pressure between fuel pressure room 17a and intake pressure room 17b exceeds predetermined value, diaphragm 23 opens up return pipe 21 by opposing the pressing force of spring 25 to reflux part of fuel to fuel tank 18 through return pipe 21 so that fuel pressure in fuel pressure room 17a keeps predetermined differential pressure against intake air pressure of surge tank.

In fuel injection control apparatus for direct injection type internal combustion engine of the first embodiment according to the present invention as thus constituted, on cranking operation of internal combustion engine 1, fuel pump 19 works to supply pressurized fuel from fuel tank 18 to pressure regulator 17 and fuel injection valve 4. When fuel pressure exceeds predetermined value, diaphragm 23 of pressure regulator 17 opens return pipe 21 by opposing pressing force of spring 25 to reflux part of fuel to fuel tank 18. Then, pressure regulator 17 controls fuel pressure therein and fuel pressure applied to fuel injection valve 4 to maintain predetermined pressure differential with intake pressure of surge tank 8, which means that a predetermined differential with pressure in combustion chamber of internal combustion engine 1 is maintained, and by holding said fuel pressure less than the maximum cylinder pressure during motoring of internal combustion engine, it is made possible for fuel pump to supply fuel at pressure lower than the maximum cylinder pressure during motoring drive of internal combustion engine.

ECU 22 receives input signals from various kinds of sensors as mentioned above and signal from intake air temperature sensor (not shown) and signal from cam angle sensor (not shown) provided on camshaft of internal combustion engine and controls fuel injection, ignition, EGR, etc. EGR is controlled according to control map set beforehand according to operating conditions, with the EGR control valve 15 driven following this map to control refluxing volume of exhaust gas. Ignition control is done based on cylinder discrimination and detection of engine speed detection and crank angle detection by crank angle sensor 16 and cam angle sensor (not shown) and optimum ignition timing is calculated based on this data and the input such as load condition of internal combustion engine or temperature of cooling water and results in the ignition coil being energized or cut off.

As for fuel injection control, intake air volume of each cylinder is detected based on signal from air flow sensor 6, discrimination of cylinder and stroke is done based on signal from crank angle sensor 16 etc. so that fuel injection amount is set by calculating the opening duration of valve in accordance with intake air volume while driving fuel injection valve 4 and open timing and close timing of the valve is determined by calculating open timing in accordance with this opening duration of valve. In addition, the duration of valve opening, namely fuel ignition volume, undergoes feedback control to let fuel-air mixture have the theoretical air-fuel ratio based on signal from air-fuel ratio sensor 17 attached to exhaust manifold 10 of internal combustion engine 1. Timing of closing of fuel injection valve 4, namely timing of end of fuel ignition, varies depending on rotational speed or load condition of internal combustion engine, temperature of cooling water, etc. but the maximum delay fuel injection end timing is controlled as described below to bring fuel injection to an end at least by the time intake valve 9 of internal combustion engine closes.

FIG. 3 is a control block diagram which shows control set description timing of fuel injection ending. Basic end timing of fuel injection is determined by means of searching the map for the values of rotational speed of internal combustion engine 1 and load amount obtained from intake air volume, wherein since the higher the engine speed becomes or heavier the load becomes, the longer the injection time is, end timing of fuel injection shifts so that phase angle timing shows lag. As for the compensation for water temperature, since carburetion condition of fuel and fuel injection volume varies depending on temperature of internal combustion engine 1, end timing of fuel injection should be compensated. In other words, since injection volume becomes large and fuel vaporization delays as water temperature drops, control for advancing end timing of fuel injection is carried out to achieve appropriate injection volume and combustion condition so that worsening of exhaust gas is prevented and drivability is improved.

After having compensated injection amount and fuel injection timing depending on various kinds of condition, injection end timing is clipped at a certain angle which is before the crank angle position for closing intake valve 9 of internal combustion engine 1 calculated from stroke discrimination as mentioned above so as to set opening duration of valve based on said end timing of fuel injection. Therefore, as shown in FIG. 4, pressure in combustion chamber while intake valve 9 opens is low and fuel is injected during the time when pressure maintains approximately constant value so that fuel pump 19 arranged in fuel tank 18 is capable of highly precise fuel injection at relatively low fuel pressure, and as pressure differential between fuel pressure and internal pressure of combustion chamber is held constant by means of pressure regulator 17, fuel is atomized sufficiently without being influenced by load condition of internal combustion engine so that fuel injection amount is also secured stability.

As explained above, in fuel injection control apparatus for direct injection type internal combustion engine of the first embodiment according to the present invention, since ECU as a control means controls injection volume and fuel injection timing of fuel injection valve depending on operating condition of internal combustion engine and controls closing position of intake valve so that fuel injection ends before intake valve of internal combustion engine closes, even if fuel pressure of fuel pump is set lower than maximum cylinder pressure during motoring of internal combustion engine, injection volume error is reduced so that high pressure pump or high pressure pipe arrangement becomes unnecessary and miniaturization and cost-reduction is made possible.

In addition, since the apparatus is equipped with pressure regulator which compares surge tank pressure with fuel pressure to maintain pressure differential therebetween, pressure differential between fuel pressure and internal pressure of combustion chamber is always held constant regardless of load fluctuation of internal combustion engine so that fuel injection volume is kept precisely at the appropriate value. Furthermore, since ECU controls to advance the closing timing of fuel injection valve, fuel injection amount shows no increase even at low temperature and atomization of fuel is made possible to provide proper firing condition so that worsening of exhaust gas is prevented and drivability is improved.

What is claimed is:

1. A fuel injection control apparatus for a direct injection type internal combustion engine comprises:

a crank angle sensor detecting rotational angle of an internal combustion engine;

a fuel injection valve directly injecting fuel to a combustion chamber of said internal combustion engine;

a fuel pump supplying fuel to said fuel injection valve whereby supply pressure of fuel is set equal to or less than the maximum cylinder pressure during motoring of said internal combustion engine; and control means for controlling open or close timing of said fuel injection valve to control fuel injection amount and fuel injection duration in response to operating conditions of said internal combustion engine and detecting end timing of an intake valve of said internal combustion engine in accordance with the rotational angle output of said crank angle sensor and controlling the fuel injection timing to close said fuel injection valve not later than the closing of said intake valve.

2. A fuel injection control apparatus for a direct injection type internal combustion engine according to claim 1 comprising a pressure regulator comparing pressure of an intake air passage of said internal combustion engine with that of fuel supplied by said fuel pump and regulating fuel pressure to control pressure differential between said two pressures to maintain a predetermined value.

3. A fuel injection control apparatus for a direct injection type internal combustion engine according to claim 1 comprising an temperature sensor detecting temperature of cooling water, whereby said control means advances the close timing of said fuel injection valve when said cooling water has low temperature.

* * * * *